(12) United States Patent
Nakadate

(10) Patent No.: US 6,283,259 B1
(45) Date of Patent: Sep. 4, 2001

(54) HYDRAULIC SHOCK ABSORBER

(75) Inventor: Takao Nakadate, Yamato (JP)

(73) Assignee: Tokico Ltd., Kanagawa-ken (JP)

( * ) Notice: Subject to any disclaimer, the term of this patent is extended or adjusted under 35 U.S.C. 154(b) by 0 days.

(21) Appl. No.: 09/160,798

(22) Filed: Sep. 25, 1998

(30) Foreign Application Priority Data

Sep. 26, 1997 (JP) ................................................. 9-279745

(51) Int. Cl.$^7$ ........................................................ F16F 9/54
(52) U.S. Cl. ........................................ 188/322.2; 188/299.1; 188/318
(58) Field of Search ........................... 188/322.19, 322.2, 188/318, 297, 287, 286, 266.6, 299.1

(56) References Cited

U.S. PATENT DOCUMENTS

| | | | |
|---|---|---|---|
| 5,282,645 | * 2/1994 | Spakowski et al. | 188/322.2 |
| 5,301,412 | 4/1994 | Hahn et al. . | |
| 5,467,851 | * 11/1995 | Handke et al. | 188/322.2 |
| 5,649,611 | * 7/1997 | Nakadate | 188/322.19 |
| 5,740,890 | * 4/1998 | Forster | 188/322.2 |
| 5,901,820 | * 5/1999 | Kashiwago et al. | 188/322.2 |
| 5,960,915 | * 10/1999 | Nezu et al. | 188/322.2 |
| 5,975,586 | * 11/1999 | Pradel | 188/322.2 |
| 5,988,331 | * 11/1999 | Schiffler | 188/322.2 |

* cited by examiner

Primary Examiner—Robert J. Oberleitner
Assistant Examiner—Robert A. Siconolfi
(74) Attorney, Agent, or Firm—Wenderoth, Lind & Ponack, L.L.P.

(57) ABSTRACT

A hydraulic shock absorber includes an inner cylinder filled with a working oil, an outer cylinder, and a reservoir defined between the inner and outer cylinders. A piston is slidably disposed within the inner cylinder so as to divide the interior of the inner cylinder into an upper cylinder chamber and a lower cylinder chamber. A piston rod is connected to the piston. A tubular member is disposed between the inner and outer cylinders and has a radial port. A damper mechanism is attached to the outer cylinder so as to control the flow of the working oil to produce a damping resistance. The outer cylinder includes a mounting projection with a substantially flat top surface on which the damper mechanism is secured. A sleeve has one end inserted into the port of the tubular member and the other, flanged end terminating at the top surface of the mounting projection. A first sealing element is secured between the sleeve and the port to provide a seal between the sleeve and the tubular member. A second sealing element is secured between the flanged end of the sleeve and the top surface of the mounting projection. A third sealing element is secured between the flanged end of the sleeve and the casing of the damper mechanism.

8 Claims, 7 Drawing Sheets

HYDRAULIC SHOCK ABSORBER

BACKGROUND OF THE INVENTION

The present invention relates to hydraulic shock absorbers, especially for use in vehicle suspension systems.

A known hydraulic shock absorber typically includes an inner working cylinder and an outer cylinder extending around the working cylinder so as to define a reservoir therebetween (see FIG. 9). The outer cylinder has an annular collar to which a mounting plate is secured by welding. A damper mechanism is attached to the mounting plate and communicated with the working cylinder through sleeves which are, in turn, inserted through the mounting plate. A problem with the known hydraulic shock absorber is that metal particles ejected during the welding, known as spatter, are introduced into oil within the reservoir, thus resulting in malfunction of the damper mechanism. Removal of such metal particles is cumbersome. Another problem is that an expensive seam weld is required to maintain the seal integrity. Moreover, with a plurality of O-rings placed on the mounting plate, the damper mechanism is secured to the mounting plate to properly position the O-rings. If the O-rings are not properly positioned, oil leakage occurs.

Accordingly, it is an object of the present invention to provide a hydraulic shock absorber which allows a damper mechanism to be mounted to an outer cylinder without the use of welding and enables proper positioning of sealing elements.

SUMMARY OF THE INVENTION

According to one aspect of the present invention, there is provided a hydraulic shock absorber comprising an inner cylinder filled with a working oil, an outer cylinder extending around the inner cylinder so as to define a reservoir therebetween, a piston slidably disposed within the inner cylinder so as to divide the interior of the inner cylinder into an upper cylinder chamber and a lower cylinder chamber, a piston rod having one end connected to the piston and the other end extending out of the inner cylinder, oil passage means communicated with the interior of the inner cylinder and adapted to allow the working oil to flow therethrough as the piston is moved, a tubular member having a port and disposed between the inner cylinder and the outer cylinder so as to define therebetween annular oil passages which form a part of the oil passage means, damper means attached to the outer cylinder for controlling flow of the working oil through the oil passage means so as to produce a damping resistance, the outer cylinder including a mounting projection with a substantially flat top surface on which the damper means is secured, a sleeve for providing fluid communication between the oil passage means and the damper means, one end of the sleeve being inserted into the port of the tubular member, and the flanged end of the sleeve terminating at the top surface of the mounting projection, first sealing means placed between the one end of the sleeve and the port of the tubular member for providing a seal between the sleeve and the port, and second sealing means placed around the flanged end of the sleeve for providing a seal between the outer cylinder and the damper means.

This arrangement eliminates the need for an expensive seam weld and thus brings about a reduction in the fabrication cost of the entire hydraulic shock absorber. Also, there is substantially no risk that spatter or other foreign substance is introduced into the working oil within the reservoir.

The second sealing means may include a first sealing element vulcanized or otherwise secured between the flanged end of the sleeve and the top surface of the mounting projection, and a second sealing element vulcanized or otherwise secured between the flanged end of the sleeve and the damper means. This arrangement ensures proper positioning of the sealing elements and thus avoids oil leakage.

According to another aspect of the present invention, there is provided a hydraulic shock absorber comprising an inner cylinder filled with a working oil, an outer cylinder extending around the inner cylinder so as to define a reservoir therebetween, a piston slidably disposed within the inner cylinder so as to divide the interior of the inner cylinder into an upper cylinder chamber and a lower cylinder chamber, a piston rod having one end connected to the piston and the other end extending out of the inner cylinder, oil passage means communicated with the interior of the inner cylinder and adapted to allow the working oil to flow therethrough as the piston is moved, a tubular member having a port and disposed between the inner cylinder and the outer cylinder so as to define therebetween annular oil passages which form a part of the oil passage means, damper means attached to the outer cylinder for controlling flow of the working oil through the oil passage means so as to produce a damping resistance, the outer cylinder including a mounting projection with a substantially flat top surface on which the damper means is secured, a sleeve for providing fluid communication between the oil passage means and the damper means, one end of the sleeve being inserted into the port of the tubular member, and the flanged end of the sleeve terminating at the top surface of the mounting projection, and sealing means tightly fitted around the sleeve and having a generally cylindrical shape. The sealing means includes an enlarged end and a flanged end opposite the enlarged end, the enlarged end of the sealing means being fitted around the one end of the sleeve and sandwiched between the port and the one end of the sleeve to provide a seal therebetween. The flanged end of the sealing means is fitted around the flanged end of the sleeve and includes an annular inner lip and an annular outer lip, the annular inner lip being pressed against the damper means, and the outer lip being sandwiched between the flanged end of the sleeve and the top surface of the mounting projection.

The enlarged end of the sealing means has a pressure bearing area on which pressure is exerted by the working oil, and the inner lip of the sealing means has a pressure bearing area on which pressure is exerted by the working oil. Preferably, the pressure bearing area of the enlarged end is greater than the pressure bearing area of the inner lip. With this arrangement, the sealing means is biased toward the damper means to improve the seal integrity.

DESCRIPTION OF THE PREFERRED EMBODIMENTS

Figure 1:
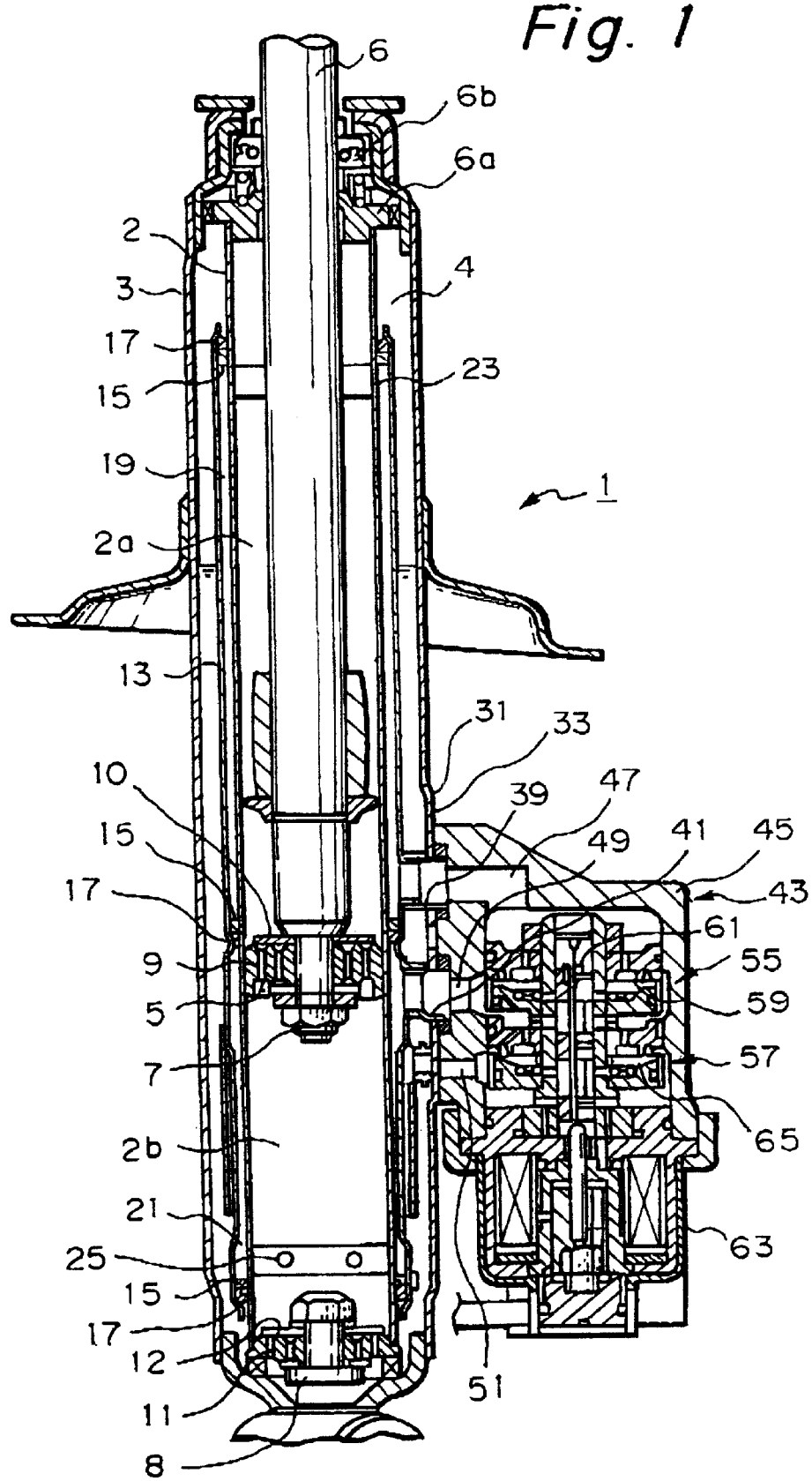
FIG. 1 is a sectional elevation of a hydraulic shock absorber assembled according to one embodiment of the present invention.

Referring to FIG. 1, there is shown a hydraulic shock absorber assembled according to one embodiment of the present invention. Specifically, a hydraulic shock absorber 1 includes two concentric cylinders, namely, an inner working cylinder 2 and an outer cylinder 3. A reservoir 4 is defined between the working cylinder 2 and the outer cylinder 3. A piston 5 is disposed within the working cylinder 2 to thereby divide the interior of the working cylinder 2 into an upper cylinder chamber 2a and a lower cylinder chamber 2b. A piston rod 6 has one end connected to the piston 5 by a nut 7. The other end of the piston rod 6 extends along the upper cylinder chamber 2a, through a rod guide 6a and a seal assembly 6b, and then out of the outer cylinder 3. The rod guide 6a and the seal assembly 6b are mounted in the upper end of the working cylinder 2 and the outer cylinder 3. A base valve 8 is mounted in the lower end of the working cylinder 2 so as to separate the lower cylinder chamber 2b from the reservoir 4. The working cylinder 2 is filled with oil. The reservoir 4 is filled with oil and gas.

A plurality of oil passages 9 are axially formed in the piston 5 so as to provide a fluid communication between the upper cylinder chamber 2a and the lower cylinder chamber 2b. A check valve 10 is disposed in the piston 5 so as to allow the flow of oil from the lower cylinder chamber 2b to the upper cylinder chamber 2a through the oil passages 9. Similarly, a plurality of oil passages 11 are formed in the base valve 8 so as to provide fluid communication between the lower cylinder chamber 2b and the reservoir 4. A check valve 12 is also disposed in the base valve 8 so as to allow the flow of oil from the reservoir 4 to the lower cylinder chamber 2b through the oil passages 11.

A single tubular member 13 is placed around and secured to the working cylinder 2 by three annular packings 15 and three backup rings 17. The tubular member 13 has a substantially cylindrical shape and is of a one-piece construction. Upper and lower annular oil passages 19, 21 are defined between the tubular member 13 and the working cylinder 2. The upper annular oil passage 19 is communicated with the upper cylinder chamber 2a through a plurality of apertures 23 which are, in turn, formed in the upper end of the working cylinder 2. Similarly, the lower annular oil passage 21 is communicated with the lower cylinder chamber 2b through a plurality of apertures 25 which are, in turn, formed in the lower end of the working cylinder 2. As better shown in FIG. 2, the tubular member 13 includes two integral radial ports 27, 29 which are communicated with the upper and lower annular oil passages 19, 21, respectively.

Figure 2:
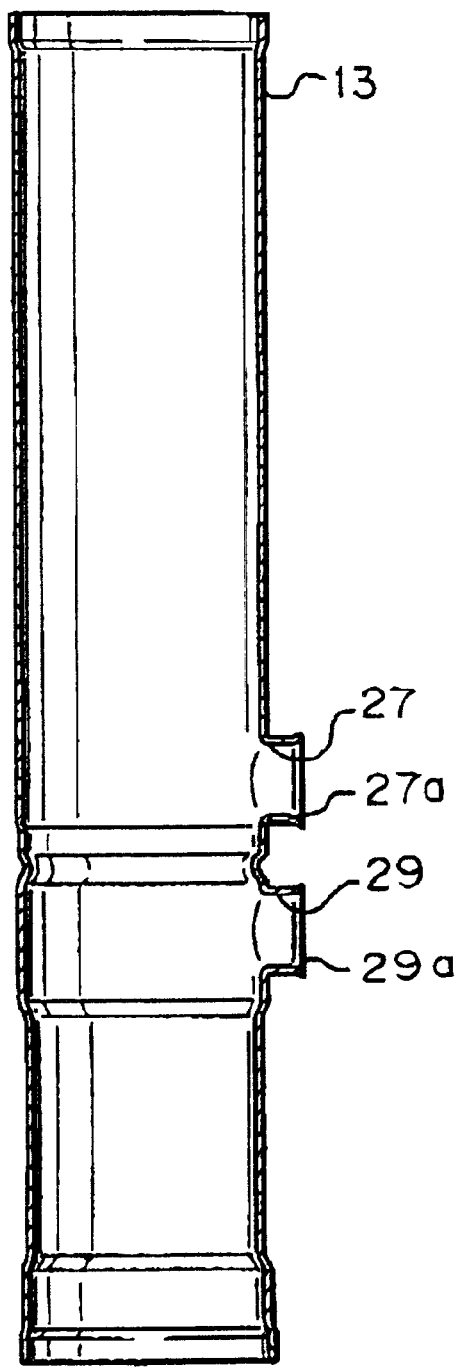
FIG. 2 is a schematic view of a single tubular member used in the hydraulic shock absorber shown in FIG. 1.
Figure 3:
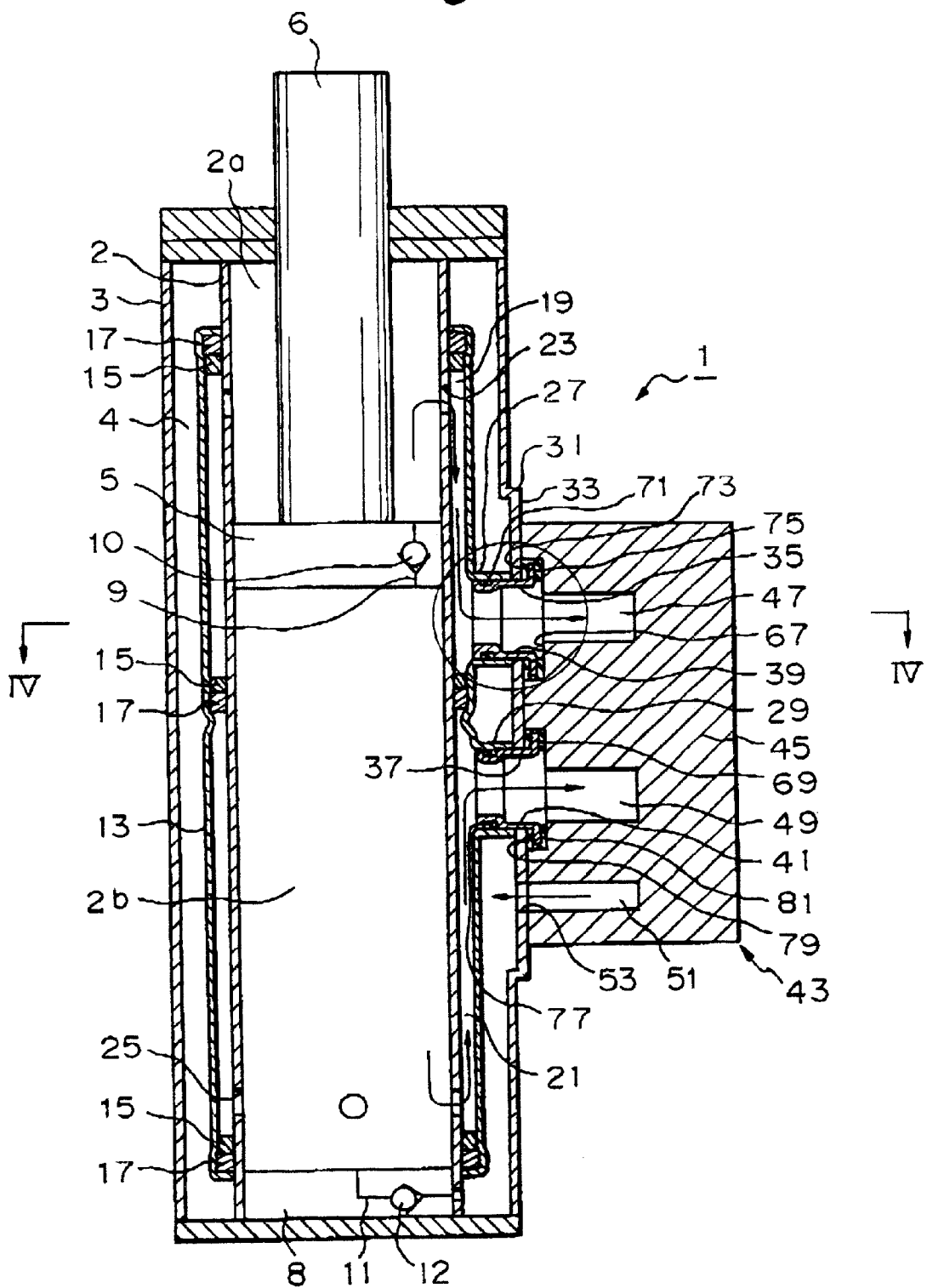
FIG. 3 is a schematic view, on an enlarged scale, of the hydraulic shock absorber shown in FIG. 1.
Figure 4:
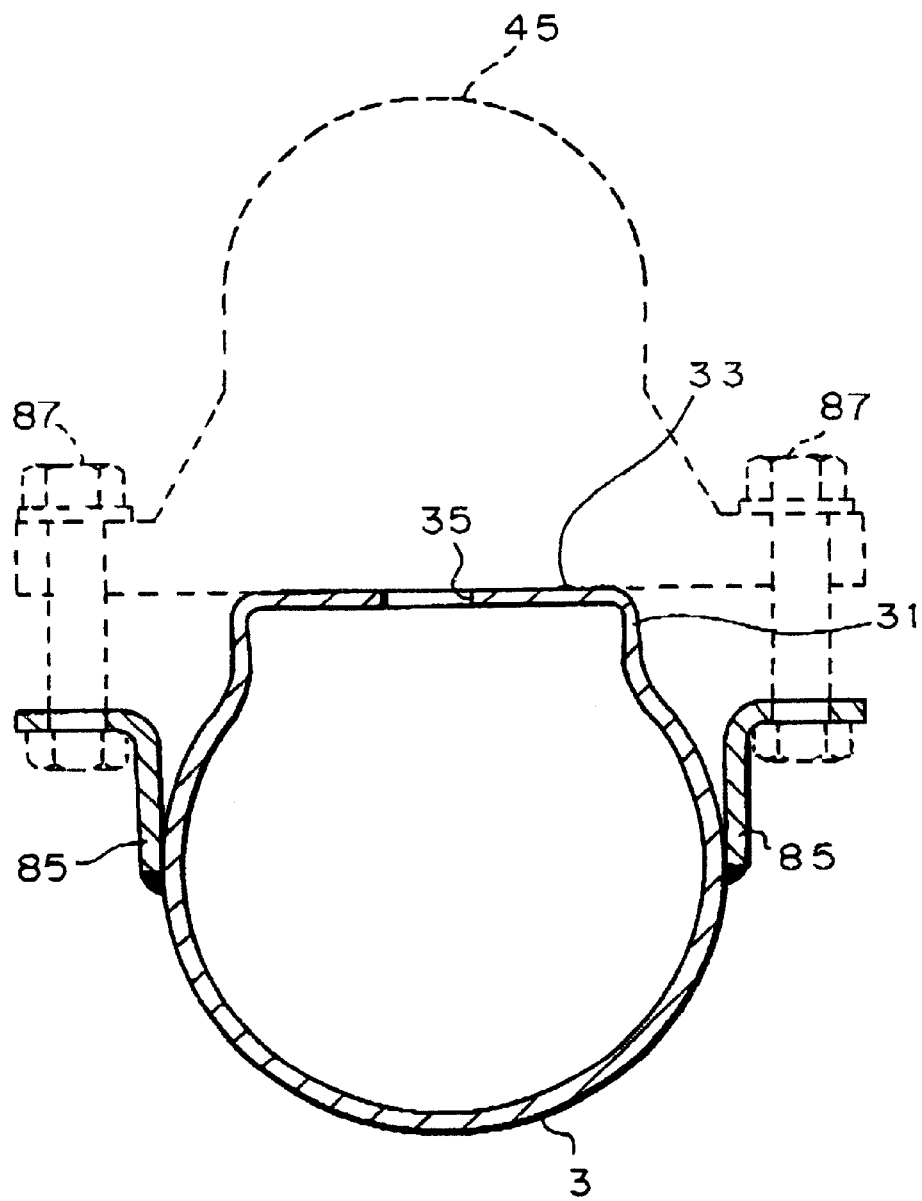
FIG. 4 is an enlarged sectional view taken on the line IV—IV in FIG. 3.
Figure 5:
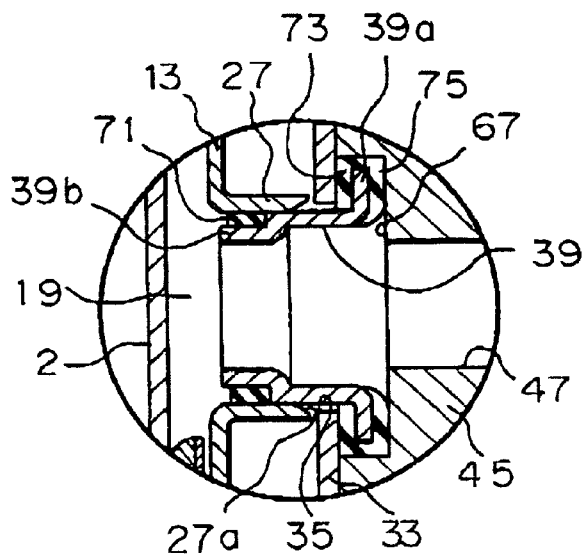
FIG. 5 is a partial view of the hydraulic shock absorber as encircled in FIG. 3, showing the manner in which sealing elements are secured between the tubular member and a casing.

Referring to FIGS. 3 to 5, the outer cylinder 3 has a mounting projection 31. The mounting projection 31 is integrally formed in the outer cylinder 3 by, for example, a press. The mounting projection 31 has a substantially flat top surface 33 and includes two openings 35, 37 formed in the top surface 33. The two openings 35, 37 are aligned with the two ports 27, 29 of the tubular member 13, respectively. Two sleeves 39, 41 are inserted into the ports 27, 29 through the openings 35, 37, respectively. As best shown in FIG. 2, the ports 27, 29 preferably have beveled ends 27a, 29a so that the sleeves 39, 41 may readily be inserted into the corresponding ports 27, 29.

Referring back to FIG. 1, a damper mechanism 43 is secured to the mounting projection 31 of the outer cylinder 3 and has a casing 45. The casing 45 includes three oil passages 47, 49, and 51. Of the three, the oil passage 47 is communicated with the upper annular oil passage 19 through the sleeve 39. Similarly, the oil passage 49 is communicated with the lower annular oil passage 21 through the sleeve 41. The oil passage 51 is communicated with the reservoir 4 through an opening 53 which is, in turn, formed in the top surface 33 of the mounting projection 31. An expansion damper valve assembly 55 is disposed within the casing 45 so as to control the flow of oil between the oil passage 47 and the oil passage 49 to produce a damping force or resistance. Also, a compression damper valve assembly 57 is disposed below the expansion damper valve assembly 55 so as to control the flow of oil between the oil passage 49 and the oil passage 51 to produce a damping resistance.

The expansion damper valve assembly 55 includes a pressure control valve or main valve 59, and a spool or pilot valve 61. A proportional solenoid actuator 63 is operatively associated with the damper mechanism 43. The spool valve 61 is operated by the actuator 63 and designed to directly adjust orifice characteristics (in this case, damping resistance is substantially proportional to the square of piston speed) by changing the effective cross sectional area of a flow passage between the oil passage 47 and the oil passage 49 and at the same time, adjust valve characteristics (in this case, damping resistance is substantially proportional to piston speed) by changing pilot pressure, namely, a pressure necessary to open the pressure control valve 59.

The compression damper valve assembly 57 includes a pressure control valve or main valve 65 and the spool valve 61. As in the expansion damper valve assembly 59, the spool valve 61 is operable to directly adjust orifice characteristics by changing the effective cross sectional area of a flow passage between the oil passage 49 and the oil passage 51 and, at the same time, adjust valve characteristics by changing the pilot pressure, namely a pressure necessary to open the pressure control valve 65. The damper mechanism 43 per se forms no part of the present invention and will not be described in detail.

As important features of the present invention, one side of the casing 45 which is attached to the mounting projection 31 is provided with two enlarged recesses 67, 69 extending around one end of the oil passages 47, 49. The sleeve 39 has a flanged end 39a and a reduced diameter end 39b as shown in FIGS. 3 and 5. Similarly, the sleeve 41 has a flanged end 41a and a reduced diameter end 41b. The flanged ends 39a, 41a of the sleeves 39, 41 are received in the enlarged recesses 67, 69, respectively. As best shown in FIG. 5, an annular sealing element 71 is fixed between the reduced diameter end 39a of the sleeve 39 and the port 27 so as to provide a tight seal therebetween. Another annular sealing element 73 is fixed between the flat top surface 33 of the mounting projection 31 and the flanged end 39a of the sleeve 39 to provide a tight seal therebetween. An additional annular sealing element 75 is fixed between the flanged end 39a of the sleeve 39 and the enlarged recess 67 of the casing 45 to provide a tight seal therebetween. Similarly, an annular sealing element 77 is fixed between the reduced diameter end 41a of the sleeve 41 and the port 29 so as to provide a tight seal therebetween. Another annular sealing element 79 is fixed between the flat top surface 33 of the mounting projection 31 and the flanged end 41a of the sleeve 41 to provide a tight seal therebetween. An additional annular sealing element 81 is fixed between the flanged end 41a of the sleeve 41 and the enlarged recess 69 of the casing 45 to provide a tight seal therebetween. The annular sealing elements 71, 73, 75, 77, 79, 81 may be made of rubber or synthetic resins. Also, the annular sealing elements may be adhesively attached, vulcanized or otherwise secured in place.

Figure 6:
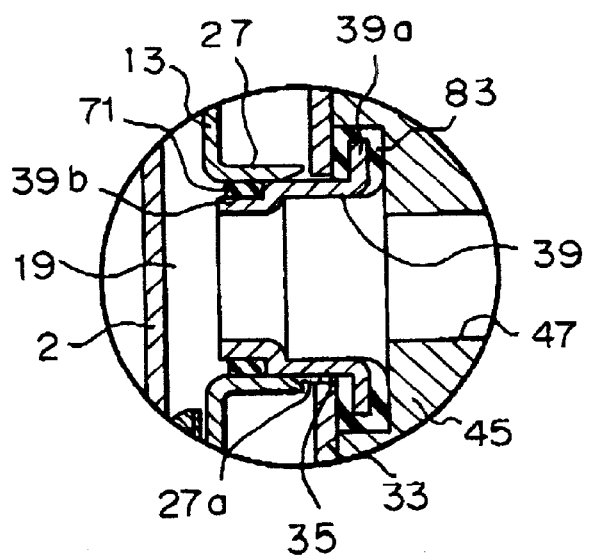
FIG. 6 is a view similar to that of FIG. 5, but showing a modified form of the sealing elements.

As an alternative, a single sealing element 83, rather than two separate sealing elements, may be tightly fitted around the flanged end 39a of the sleeve 39 to provide a seal between the casing 45 and the top surface 33 of the mounting projection 31, as shown in FIG. 6. Also, another sealing element (not shown) may be tightly fitted around the flanged end 41a of the sleeve 41 to provide a seal between the casing 45 and the top surface 33 of the mounting projection 31. In FIG. 6, like parts are designated by like reference numerals used in FIG. 5.

Referring again to FIG. 4, the casing 45 is secured to a pair of opposite flanges 85 of the outer cylinder 3 by bolts 87.

Operation of the hydraulic shock absorber will be discussed below.

As the piston 5 is moved during an expansion process, the check valve 10 is closed to pressurize oil within the upper cylinder chamber 2a. The pressurized oil is caused to flow from the upper cylinder chamber 2a to the upper annular oil passage 19 through the apertures 23. The oil is then directed to the oil passage 47 of the damper mechanism 43 through the sleeve 39. Thereafter, the oil flows from the expansion damper valve assembly 55 to the lower annular oil passage 21 through the oil passage 49 and the sleeve 41. Finally, the oil flows to the lower cylinder chamber 2b through the apertures 25. Also, a part of the oil whose volume corresponds to the volume of a part of the piston rod extended out of the working cylinder 2 is directed from the reservoir 4 to the lower cylinder chamber 2b as the check valve 12 of the base valve 8 is opened. When the piston 5 is moved at a low speed, damping resistance is produced according to the effective cross sectional area of the flow passage of the spool valve 61. When the piston 5 is moved at a high speed, the pressure control valve 59 is opened so as to adjust the effective cross sectional area of the flow passage of the spool valve 61 to produce a damping resistance.

As the piston 5 is moved during a compression process, the check valve 10 of the piston 5 is opened to allow oil within the lower cylinder chamber 2b to flow directly to the upper cylinder chamber 2a through the oil passages 9. As a result, the pressure within the lower cylinder chamber 2b and the pressure within the upper cylinder chamber 2a become substantially equal. Under the circumstances, no oil flows between the oil passage 47 and the oil passage 49. As the piston 5 is further extended into the working cylinder 2, the check valve 12 of the base valve 8 is closed to thereby pressurize oil within the lower cylinder chamber 2b. The pressurized oil is caused to flow from the lower cylinder chamber 2b to the lower annular oil passage 21 through the apertures 25. The oil is then directed to the compression damper valve assembly 57 through the oil passage 49 and the sleeve 41. Finally, the oil flows to the reservoir 4 through the oil passage 51 and the opening 53. As the piston 5 is moved at a low speed, damping resistance is produced according to the effective cross sectional area of the flow passage of the spool valve 61. As the piston 5 is moved at a high speed, the pressure control valve 65 is opened to produce a damping resistance.

Figure 7:
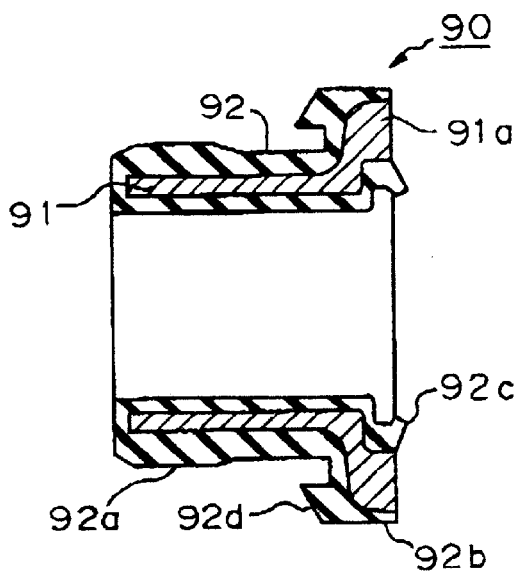
FIG. 7 is an enlarged sectional view of a modified form of the sleeve and sealing elements.
Figure 8:
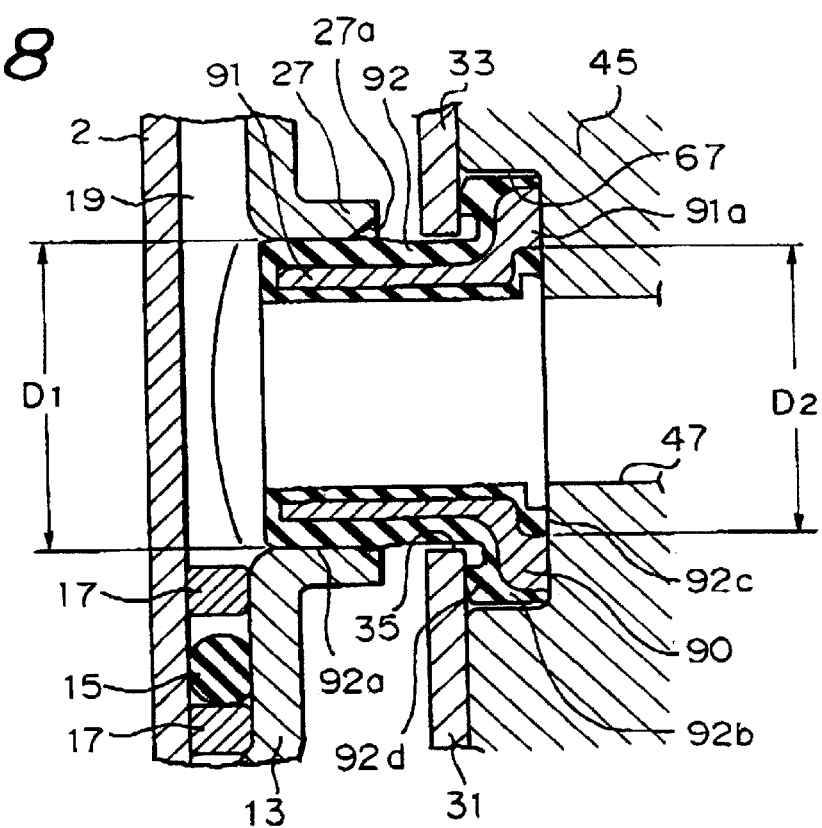
FIG. 8 is a partial sectional view showing the manner in which the sleeve shown in FIG. 7 is secured between the tubular member and the casing.
Figure 9:
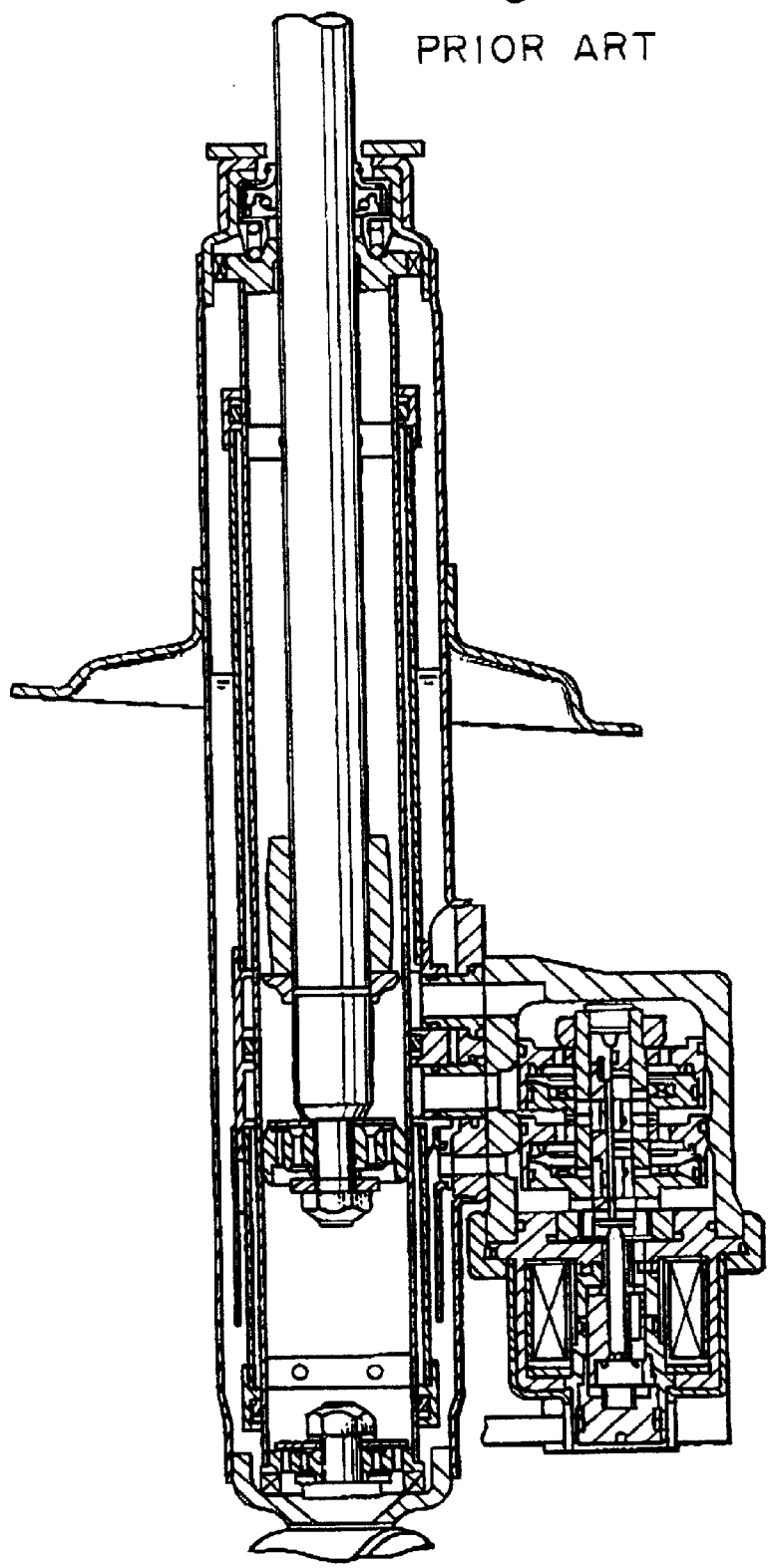
FIG. 9 is a sectional elevation of a known hydraulic shock absorber.

Referring to FIGS. 7 and 8, there is illustrated a hydraulic shock absorber assembled according to another embodiment of the present invention. This embodiment is substantially similar to the embodiment shown in FIGS. 1 to 5 except for the structure of the sleeves and sealing elements. Thus, like parts are given like reference numerals as used in FIGS. 1 to 5.

As shown in FIG. 7, a sleeve 90 includes a substantially cylindrical sleeve body or insert 91 with a flanged end 91a, and a sealing element 92 tightly fitted around the insert 91. The sealing element 92 is substantially cylindrical in shape and has an enlarged end 92a and a flanged end 92b. An annular inner lip 92c extends radially outwardly from the flanged end 92b of the sealing element 92. Also, an annular outer lip 92d extends radially inwardly from the flanged end 92b of the sealing element 92.

As shown in FIG. 8, when the sleeve 90 is inserted into the port 27 of the tubular member 13 through the opening 35 of the flat top surface 33 of the mounting projection 31, the enlarged end 92a is sandwiched between the inner wall of the port 27 and the insert 91 to provide a tight seal between the port 27 and the sleeve 90. Also, the outer lip 92d of the sealing element 92 is sandwiched between the top surface 33 of the mounting projection 31 and the flanged end 91a of the insert 91 to provide a tight seal therebetween. The inner lip 92c of the sealing element 92 is sandwiched between the flanged end 91a of the insert 91 and the bottom of the enlarged recess 67 to provide a tight seal between the sleeve 90 and the casing 45. Another sleeve (not shown) of identical structure is inserted into the port 29.

The outer diameter D1 of the enlarged end 92a of the sealing element 92 is greater than the outer diameter D2 of the inner lip 92c of the sealing element 92 when the sleeve 90 is secured between the casing 45 and the tubular member 13 as shown in FIG. 8. In other words, the pressure bearing area of the enlarged end 92a is greater than that of the inner lip 92c. By this arrangement, when oil flows into the port 27, the entire sleeve 90 is biased toward the enlarged recess 67 of the casing 45 to improve the sealing integrity. This bias proportionally increases with the oil pressure.

Although the present invention has been described with respect to Its preferred embodiments, it is to be understood that various modifications and changes may be made without departing from the scope of the invention as defined by the appended claims.

What is claimed is:

1. A hydraulic shock absorber, comprising:
an inner cylinder filled with working oil, said inner cylinder having an interior;
an outer cylinder extending around said inner cylinder so as to define a reservoir therebetween;
a piston slidably disposed within said inner cylinder so as to divide said interior of said inner cylinder into an upper cylinder chamber and a lower cylinder chamber;
a piston rod having one end connected to said piston and the other end extending out of said inner cylinder;
an oil passage communicated with said interior of said inner cylinder and adapted to allow the working oil to flow therethrough as said piston is moved;
a tubular member disposed between said inner cylinder and said outer cylinder so as to define annular oil passages therebetween, said annular oil passages forming a part of said oil passage, and said tubular member including a port through which the working oil flows;
a damper attached to said outer cylinder for controlling flow of the working oil through said oil passage so as to produce a damping resistance, wherein said outer cylinder includes an integral mounting projection having a substantially flat top surface on which said damper is secured;

a sleeve for providing fluid communication between said oil passage and said damper, said sleeve having one end extending into said port of said tubular member and a flanged end opposite to said one end, wherein said flanged end of said sleeve extends outwardly from said outer cylinder and terminates above said top surface of said mounting projection;

a first seal placed between said one end of said sleeve and said port of said tubular member for sealing between said sleeve and said port; and a second seal placed around said flanged end of said sleeve for sealing between said outer cylinder and said damper;

wherein said second seal includes a first sealing element disposed between said flanged end of said sleeve and said second top surface of mounting projection, and a second sealing element disposed between said flanged end of said sleeve and said damper.

2. A hydraulic shock absorber according to claim 1, wherein said mounting projection is formed In the outer cylinder by a press.

3. A hydraulic shock absorber according to claim 1, wherein said damper includes a casing, said casing including a recess shaped to receive said flanged end of said sleeve, and said second sealing element is disposed between said flanged end of said sleeve and said recess of said damper.

4. A hydraulic shock absorber according to claim 1, wherein said damper includes a valve and said sleeve is disposed upstream of at least said valve of said damper.

5. A hydraulic shock absorber according to claim 1, wherein said damper is secured to said outer cylinder by bolts.

6. A hydraulic shock absorber according to claim 1, wherein said first seal is vulcanized between said one end of said sleeve and said port of sail tubular member, and said second seal is vulcanized between said outer cylinder and said damper.

7. A hydraulic shock absorber comprising:

an inner cylinder filled with a working oil, said inner cylinder having an interior:

an outer cylinder extending around said inner cylinder so as to define a reservoir therebetween;

a piston slidably disposed within said inner cylinder so as to divide said interior of said inner cylinder into an upper cylinder chamber and a lower cylinder chamber;

a piston rod having one end connected to said piston and the other end extending out of said inner cylinder;

oil passage means communicated with said interior of said inner cylinder and adapted to allow the working oil to flow therethrough as said piston is moved;

a tubular member disposed between said inner cylinder and said outer cylinder so as to define annular oil passages therebetween, said annular oil passages forming a part of said oil passage means, said tubular member including a port through which the working oil flows;

damper means attached to said outer cylinder for controlling flow of the working oil through said oil passage means so as to produce a damping resistance, said outer cylinder including a mounting projection with a substantially flat top surface on which said damper means is secured;

a sleeve for providing a fluid communication between said oil passage means and said damper means, said sleeve having one end and a flanged end opposite said one end of said sleeve, said one end of said sleeve being inserted into said port of said tubular member, and said flanged end of said sleeve terminating at said top surface of said mounting projection; and sealing means tightly fitted around said sleeve and having a generally cylindrical shape, said sealing means including an enlarged end and a flanged end opposite said enlarged end, said enlarged end of said sealing means being fitted around said one end of said sleeve and sandwiched between said port and said one end of said sleeve to provide a seal therebetween, and said flanged end of said sealing means being fitted around said flanged end of said sleeve and including an annular inner lip and an annular outer lip, said annular inner lip being pressed against said damper means, and said outer lip being sandwiched between said flanged end of said sleeve and said top surface of said mounting projection.

8. A hydraulic shock absorber according to claim 7, wherein said enlarged end of said sealing means has a pressure bearing area on which pressure is exerted by the working oil, and said inner lip of said sealing means has a pressure bearing area on which pressure is exerted by the working oil, said pressure bearing area of said enlarged end being greater than said pressure bearing area of said inner lip, so that said sealing means is biased toward said damper means.

* * * * *